United States Patent [19]
Steely, Jr.

[11] Patent Number: 5,509,135
[45] Date of Patent: Apr. 16, 1996

[54] MULTI-INDEX MULTI-WAY SET-ASSOCIATIVE CACHE

[75] Inventor: Simon C. Steely, Jr., Hudson, N.H.

[73] Assignee: Digital Equipment Corporation, Maynard, Mass.

[21] Appl. No.: 951,623

[22] Filed: Sep. 25, 1992

[51] Int. Cl.$^6$ .................................................. G06F 13/00
[52] U.S. Cl. ................................................................ 395/474
[58] Field of Search ...................................... 395/400, 425; 364/200

[56] References Cited

U.S. PATENT DOCUMENTS

| | | | |
|---|---|---|---|
| 4,860,199 | 8/1989 | Langendorf et al. | 364/200 |
| 4,942,520 | 7/1990 | Langendorf | 364/200 |
| 5,014,195 | 5/1991 | Farrell et al. | 364/200 |
| 5,067,078 | 11/1991 | Telgam et al. | 395/400 |
| 5,091,851 | 2/1992 | Shelton et al. | 395/425 |
| 5,133,061 | 7/1992 | Melton et al. | 395/425 |
| 5,136,700 | 8/1992 | Thacker | 395/400 |
| 5,155,832 | 10/1992 | Hunt | 395/425 |
| 5,182,799 | 1/1993 | Tamura et al. | 395/400 |

OTHER PUBLICATIONS

Liu–Xor Randomiztion in Cache Congruence Class Indexing IBM Technical Disclosure Bulletin–vol. 27, No. 2. Jul. 1984.

Primary Examiner—Kevin J. Teska
Assistant Examiner—Stephen J. Walder, Jr.
Attorney, Agent, or Firm—Dirk Brinkman; Ronald C. Hudgens; Arthur W. Fisher

[57] ABSTRACT

A plurality of indexes are provided for a multi-way set-associate cache of a computer system. The cache is organized as a plurality of blocks for storing data which are a copies of main memory data. Each block has an associated tag for uniquely identifying the block. The blocks and the tags are addressed by indexes. The indexes are generated by a Boolean hashing function which converts a memory address to cache indexes by combining the bits of the memory address using an exclusive OR function. Different combination of bits are used to generate a plurality of different indexes to address the tags and the associated blocks to transfer data between the cache and the central processing unit of the computer system.

17 Claims, 5 Drawing Sheets

MULTI-INDEX MULTI-WAY SET-ASSOCIATIVE CACHE

FIELD OF THE INVENTION

This invention relates to memory buffer caches for use in computer systems, and more particularly to a method and apparatus which improves the hit ratio of multi-way set-associative caches.

BACKGROUND OF THE INVENTION

In a computer system, the speed at which the central processor unit (CPU) operates depends upon the rate at which instructions and operands (data) are transferred between memory and the CPU. This is particularly true for computer systems that use multiple pages to increase the amount of addressable memory. In an attempt to improve the data transfer rate between memory and the CPU, many modern computer systems include a memory buffer cache.

A cache is a relatively small, random access memory (RAM) used to store a copy of memory data in anticipation of future use by the CPU. A cache may be implemented by one or more dynamic RAM (DRAM) integrated circuits. For very high speed caches, the RAM is usually an integral part of the CPU chip. The data stored in a cache can be transferred to the CPU in substantially less time than data stored in memory. The utility of a cache arises from the fact that a cache can take advantage of the principles of locality of reference, which are well known in computing techniques. These principles indicate that when data stored at one location are accessed, there is a high probability that data stored at physically adjacent locations (spatial locality) will be accessed soon afterwards in time (temporal locality).

Thus, a cache is typically organized into a plurality of "blocks," wherein each block stores a copy of one or more contiguously addressable bytes of memory data. That is, access to memory data causes an entire block of data, including the referenced data, to be transferred from memory to cache, unless of course the data are already stored in the cache.

During operation of the computer system, when the CPU makes a memory reference, a determination is made if a copy of the referenced data are also stored in the cache. This is known as a "hit." If the data are not stored in cache, this is known as a "miss." The hit or miss rate is an indicator of the effectiveness of the cache.

In order to access data in the cache, the memory address is translated to a cache address. The portion of the cache address including the most significant bits of the memory address is called the "tag" and the portion including the least significant bits is called the "cache index." The cache index corresponds to the address of the block storing a copy of the referenced data, additional bits are usually also used to address the bytes within a block, that is, if each block has more than one byte of data. The tag is used to uniquely identify blocks having different memory addresses but the same cache index. Therefore, the cache typically includes a data store and a tag store. The data store is used for storing the blocks of data. The tag store, sometimes known as the directory, is used for storing the tags of each of the blocks of data. Both the data store and the tag store are accessed by the cache index. The output of the data store is a block of data, and the output of the tag store is a tag.

Since the cache address is directly computable from the memory address, such a cache is generally known as a direct-mapped cache. A key attribute of a direct-mapped cache is the short latency time in accessing data stored in the cache. However, in a direct-mapped cache, any attempt to store different blocks of data at the same cache index leads to "thrashing." Thrashing occurs when the CPU successively stores data having different memory addresses as blocks having the same cache index, essentially negating the beneficial effect of the cache, and reducing the operating speed of the computer. Thrashing is a well known phenomena in computer systems, typically due to unavoidable "hot spots" in memory which are referenced at a very high frequency compared to the rest of memory.

To increase the hit rate of the cache, and to reduce thrashing, it is well known to use multi-way set-associative mapping techniques wherein two or more concurrently addressable RAMs provide a plurality of blocks and tags for a single cache index. That is, in a conventional multi-way set-associative cache, the single cache index is used to concurrently access a plurality of blocks and tags in a set of RAMs. The number of RAMs in the set indicates the "way" number of a cache. For example, if the cache index is used to concurrently access data and tags stored in two RAMs, the cache is a two-way set-associative cache. Similarly, if the cache index is used to concurrently access data and tags stored in four RAMs, the cache is a four-way set-associative cache.

During the operation of a single-index multi-way set-associative cache, a memory access by the CPU causes each of the RAMs to be examined at the corresponding cache index location. The tag is used to distinguish the cache blocks having the same cache index but different memory addresses. If a tag comparison indicates that the desired data are stored in a cache block of one of the RAMs, that RAM is selected and the desired access is completed.

In case of a miss, a determination is made to select one of the blocks for replacement. Methods used for implementing a replacement strategy for data in a cache are well known in cache design. Typically, the replacement of blocks in a cache are done in a least recently used manner (LRU). LRU algorithms can be implemented in any number of ways. In general, an LRU algorithm selects particular blocks for replacement in aged order. That is, blocks storing data which were least recently used (LRU) are selected for replacement before blocks storing data which were most recently used (MRU). Used meaning any access, read or write to any data stored in the block. If the data in the block has been modified, that is, the data in cache is different than the copy of the data in memory, the block to be replaced is first written back to memory, before being overwritten by new data. An alternative known method uses a not most recently used (NMRU) algorithm. With an NMRU replacement strategy, the block which is selected for replacement is a block randomly selected from any block which was not most recently used.

A multi-way set-associative cache provides the advantage that there are two or more possible locations for storing data in blocks having the same cache index. This arrangement reduces thrashing due to hot spots in memory, and increases the operating speed of the computer system, presuming that hot spots are uniformly distributed over the blocks of the RAMs.

However, if hot spots are not uniformly distributed, thrashing may persist. For example, a CPU realizes improved operating speed if related data structures are page aligned. Most modern compilers start assigning related data structures, such as instruction sequences, beginning anew with each page. Also, if there is not enough room at the end of a page to store a entire data structure, the end of the page is left unused, rather than having a data structure split between two pages. Therefore, the low order addresses of a page may be disposed to be accessed at a higher rate than the high order addresses of the page. This biased distribution of memory hot spots will lead to thrashing in a traditional single-index multi-way set-associative cache. In addition, the random distribution of data and instructions may spuriously generate memory hot spots.

SUMMARY OF THE INVENTION

In accordance with the invention, there are provided a method and an apparatus to implement the method of improving the utilization of a set-associative cache. The method and apparatus are accomplished in general by a computer system including a central processor unit, having a relatively slow speed main memory and a small high speed memory buffer cache. The cache includes a plurality of sets of blocks for storing copies a plurality of bytes of contiguously addressable main memory data. Each block is addressable by a cache index.

In general, a set of address hashing functions are provided, one function for each of the sets of blocks, to randomly distribute main memory addresses across the blocks of the multi-way set-associative cache. The present method randomizes access to the blocks of each set by applying a Boolean hashing function, in particular an exclusive OR, to a memory address. A different hash function is used for each of the blocks in the set. The hashing function combines a predetermined number of bits of the tag field of a memory address with the same number of selected bits of the cache index to generate a different randomized cache index for each of the blocks in a set for any one memory address.

DETAILED DESCRIPTION OF THE PREFERRED EMBODIMENT

Figure 1:
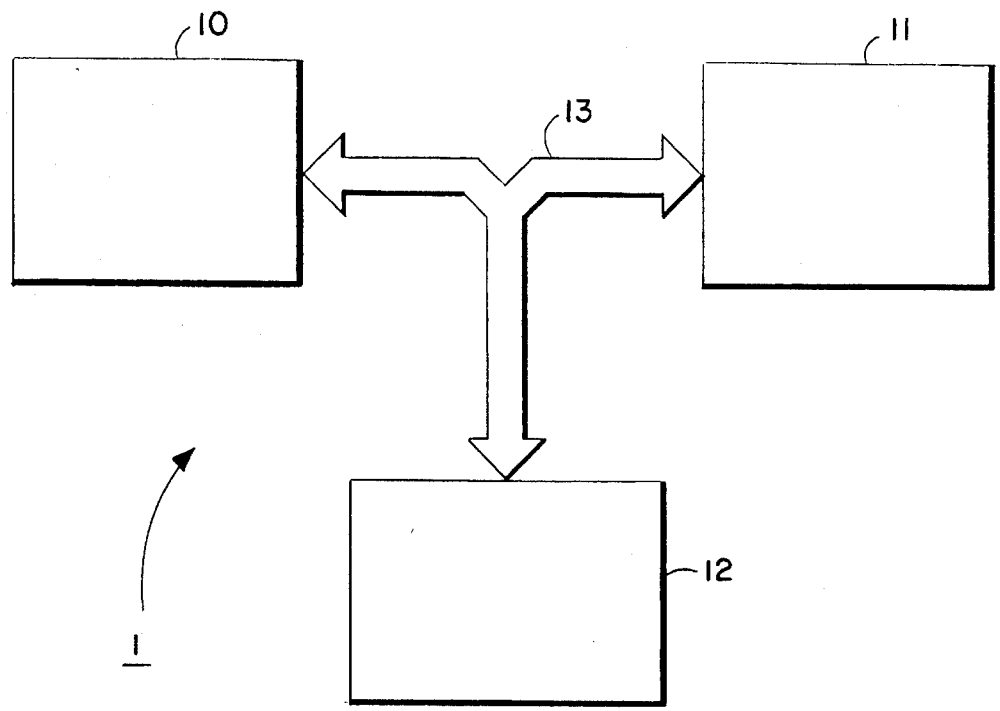
FIG. 1 is block diagram of a computer system utilizing a multi-way set-associative cache in accordance with the present invention.

Referring now to the drawings, FIG. 1 shows a computer system 1 which includes a central processing unit (CPU) 10 communicating data with a main memory 11 and a memory buffer cache 12 via address, data, and control lines, generally indicated by numeral 13. The cache 12 acts as a buffer between main memory 11 and the CPU 10 in order to increase the operating speed of the computer system 1.

The main memory 11 has a relatively large data storage capacity and a relatively long data access time when compared with the cache 12. The main memory 11 is partitioned into separately addressable pages, not shown, each page storing instructions and operands as a plurality of bytes of data.

Figure 2:
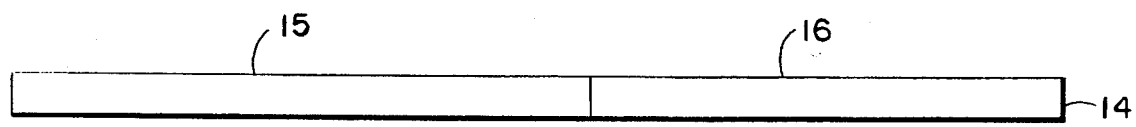
FIG. 2 is a block diagram of a main memory address.

As shown in FIG. 2, the bytes of data in main memory 11 are accessible by a main memory address 14, which includes a page number field 15 and a page address field 16. The number of bits in the page number field 15 are sufficient to address all of the pages of main memory 11. The number of bits in the page address field 16 are determined by the page size. For example, if the main memory includes 2048 pages, the page number field 15 includes at least eleven bits of page address information. And, if each page stores 512 bytes of data, the page address field 16 includes at least nine bits of byte address information for each page. Therefore, the main memory address 14 is, for example, defined by a total of twenty bits. It should be apparent to one skilled in the art, that the invention can be practiced independent of the number of bits used for addressing memory.

Figure 3:
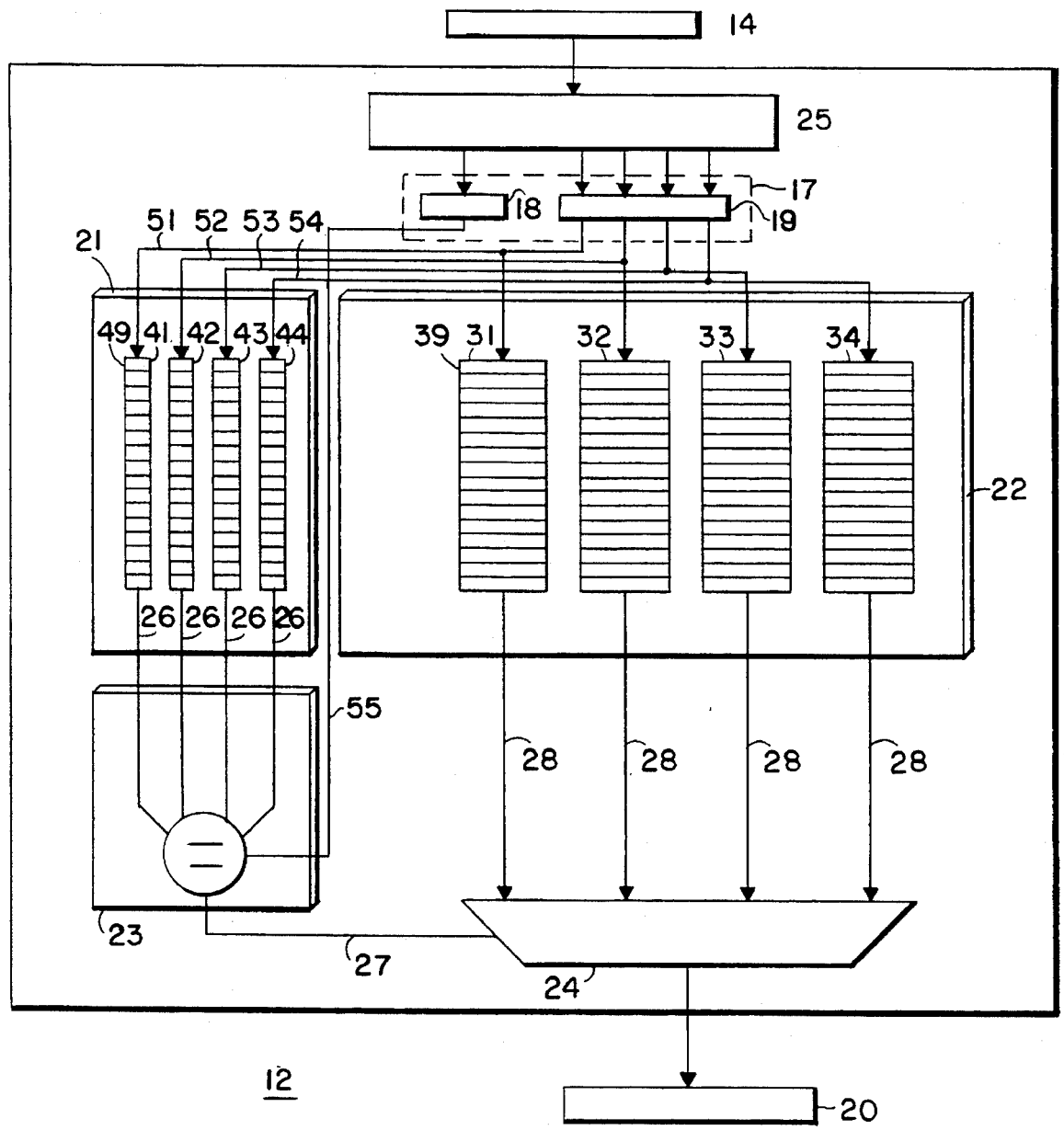
FIG. 3 is a block diagram of the multi-way set-associative cache of FIG. 1.

In FIG. 3, there is shown a multi-way set-associative cache, according to the present invention. The cache 12 comprises a tag store 21 a data store 22, a comparator 23, a selector 24, and a convertor 25. The cache 12 has as an input a main memory address 14, and as an output cache data 20.

Figure 4:
FIG. 4 is a block diagram of a cache address.

As is shown in FIG. 4, and as will be explained in further detail herein, the main memory address 14 is converted to a cache address 17 by the convertor 25. The cache address 17 is used to concurrently address the tag store 21 and the data store 22. The cache address 17, as shown in FIG. 4, includes a tag field 18, and a cache index 19. The number of bits in the cache index 19 corresponds to the size of the tag and data stores 21–22. For example, for 16K data store, the cache index 19 includes fourteen bits. Therefore, the tag field 18 includes the remaining six bits of the main memory address 14, for a total of twenty bits of cache address 17.

Now, referring again to FIG. 3, the data store 22 includes a plurality of, for example four, data RAMS 31–34 for storing copies of main memory 11 data. Each data RAM 31–34 is organized into a plurality of blocks, generally indicated by numeral 39. Each block 39 storing a copy of a plurality of, for example, sixty-four bytes of contiguously addressable main memory data. Therefore, it is understood that the low order bits of the cache address 17, for example, the low order six bits are generally used to individually address the bytes within the blocks 39.

The tag store 21 includes tag RAMs 41–44, one respectively, for each of the data RAMs 31–34. Each tag RAM 41–44 is organized into a plurality of tags, generally indicated by numeral 49, one each for each of the blocks 39 in the corresponding data RAMs 31–34. In other words, the first tag 49 of tag RAM 41 is for storing the tag field 18 of the cache address 17 of the first block 39 of the data RAM 31, and so forth.

During operation of the computer system 1, references to data stored in main memory 11, include a determination to see if a copy of the data are stored in the cache 12. If the data are stored in the cache 12, known as a hit, the CPU 10 uses the data stored in the cache 12 directly. Otherwise, if the data are not stored in cache 12, known as a mass, the data are retrieved from the main memory 11 as a block 39, and stored in the cache 12.

Prior to storing the retrieved data in the cache 12 as a block 39, one of the blocks 39 is selected to be overwritten, or replaced. Methods used for implementing a replacement strategy for cache data are well known in cache design. Typically, the replacement of blocks 39 in a cache 12 are done in a least recently used manner (LRU). Known LRU algorithms are implemented in any number of ways. In general, known LRU algorithms selects blocks 39 for replacement in an aged order. That is, blocks 39 storing data which were least recently used (LRU) are selected for replacement before blocks 39 storing data which were most recently used (MRU). Used meaning any access, read or write to any data stored in the block 39. If the data in the selected block 39 was modified, or is otherwise different than the data in memory, the selected block 39 to be replaced is first written back to main memory 11 before being overwritten by the new data. An alternative known method uses a not most recently used (NMRU) algorithm. With an NMRU replacement strategy the block 39 which is selected for replacement is a block 39 selected from any block 39 which was not accessed most recently.

To access data stored in the cache 12, the main memory address of 14 is converted to the cache address 17, by the convertor 25. The convertor 25 maps the main memory address 14 to the tag field 18 and cache index 19 of the cache address 17. The cache index 19 is used to access, concurrently, each of the data RAMs 31–34 of the data store 22 and each of the tag RAMs 41–44 of the tag store 21 via lines 51–54, respectively. If there is a block 39 of data stored in any of the data RAMS 31–34 for a given cache index 19, the data of the block 39 are output to the selector 24 via the lines 28. Also, the tag fields 18 from the corresponding tags 39 are input to the comparator 23 via the lines 26. The comparator 23 also has as an input the referenced tag field 18, via the line 55, to uniquely identify different blocks 39 of the various RAMs 31–34 having the same cache index 19. The output of the comparator 23, via the line 27, is used as an input to the selector 24, for example, a multiplexer, to select the appropriate RAM 31–34 storing the accessed block of data. The output of the selector 24 is cache data 20, a copy of the data stored at main memory address 14.

Figure 5:
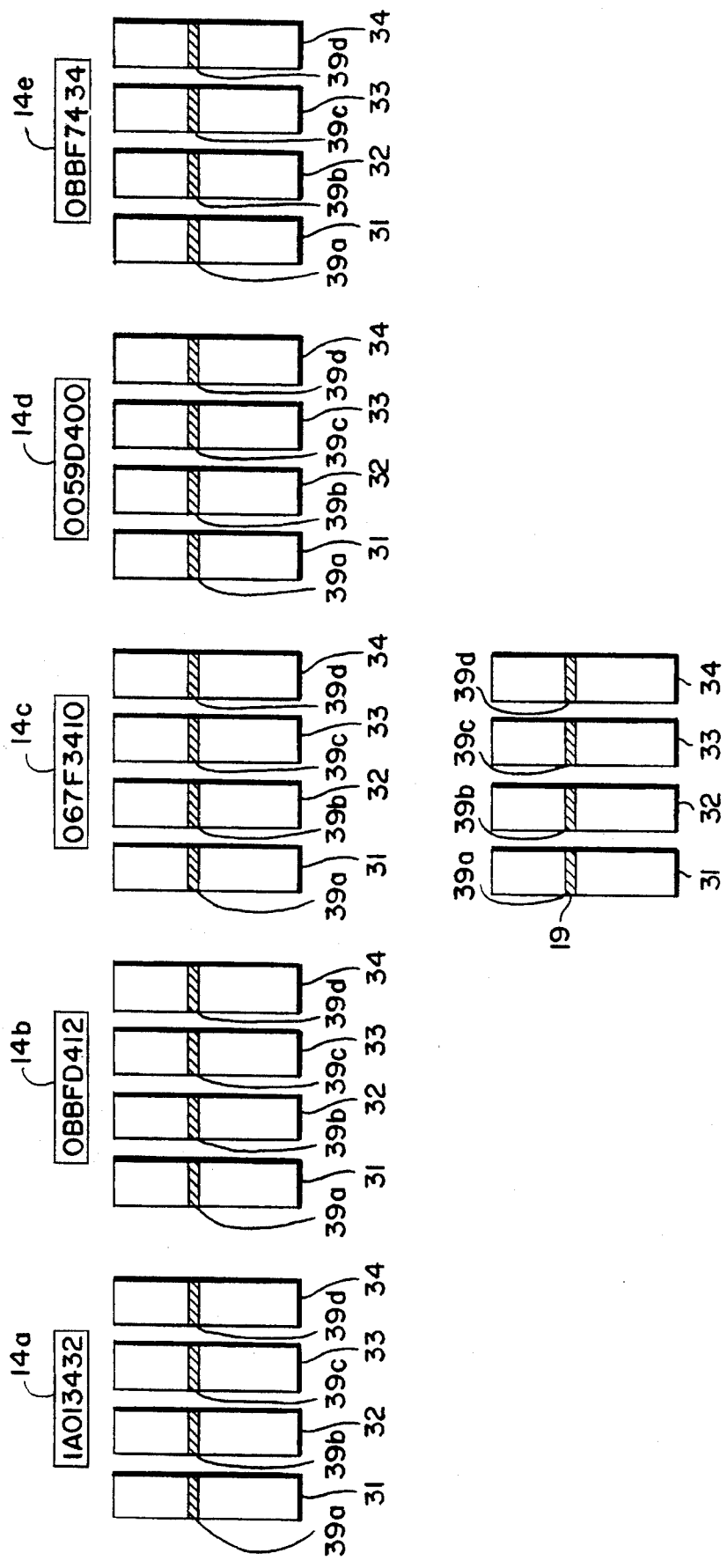
FIG. 5 is a block diagram of the distribution of blocks of data in a multi-way set-associative cache using prior art techniques.

In traditional multi-way set-associative caches, bit-by-bit direct mapping is generally used to convert the main memory address 14 to the cache address 17. As a result, hot addresses at the same relative page address will generally map to blocks 39 having the same cache index 19. For example, as shown in FIG. 5, the five different addresses 14a–14e, expressed as hexadecimal numbers "1A013432," "0BBFD412," "067F3410," "0059D400," and "0BBF7434" respectively, all map to the same cache index 19, and to blocks 39a–39d in RAMs 31–34 respectively. Consequently there are only four blocks 39a–39d, one in each of the four RAMs 31–34, all having the same cache index 19, to store data for five hot addresses 14a–14e, hence thrashing.

Figure 6:
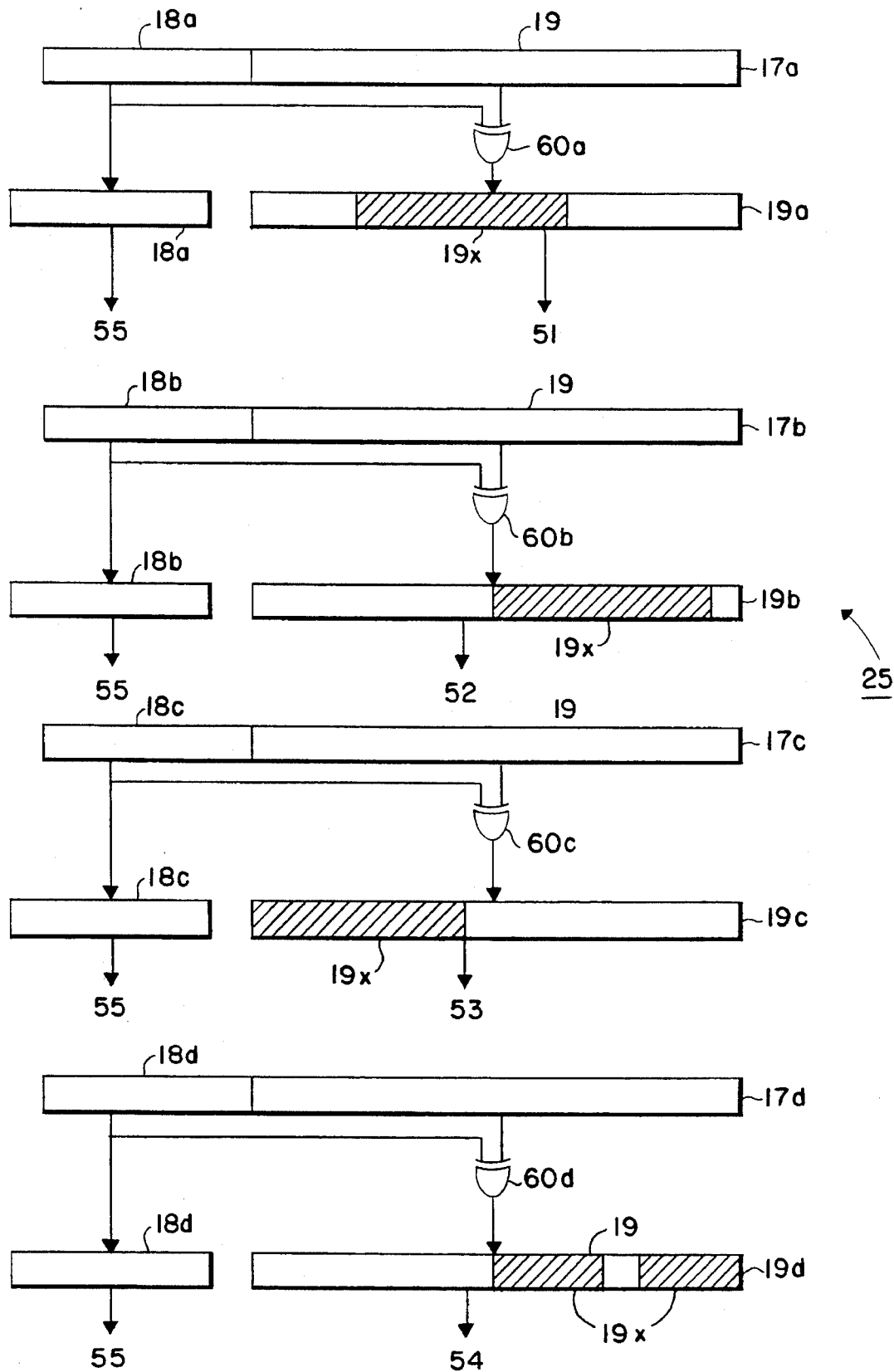
FIG. 6 is a block diagram of a hashing technique as disclosed herein.

As shown in FIG. 6, in order to improve the distribution of memory hot spots in the various blocks 39 of the data RAMs 31–34, the convertor 25 uses Boolean hashing functions in order to (pseudo) randomly generate a different cache index 19 for each of the data RAMs 31–34 and tag RAMs 41–44. The hash functions are accomplished by means of, for example, exclusive ORs (XOR) 60a–60d which combines the bits of the tag field 18a–18d with selected bits, for example the bits generally indicated by 19x, of the index field 19 to produce randomized cache indexes 19a–19d. The randomized cache indexes 19a–19d depends on both the tag field 18 and the cache index 19 of the cache address 17. The randomized cache index 19a–19d are used to access the blocks 39 of the data RAMs 31–34 and the tags 49 of the tag RAMs 41–44 via lines 51–54, respectively.

It should be apparent to one skilled in the art, that the bits of the tag field 18 and the bits of the cache index 19 can be combined in numerous different ways by means of various XOR functions, each way of combining providing a distinct randomizing capability. As shown in FIG. 6, the cache addresses 17a–17d having the same cache index 19 but different tag fields 18a–18d, produce different cache indexes 19a–19d when combined by XORs 60a–60b, respectively.

Figure 7:
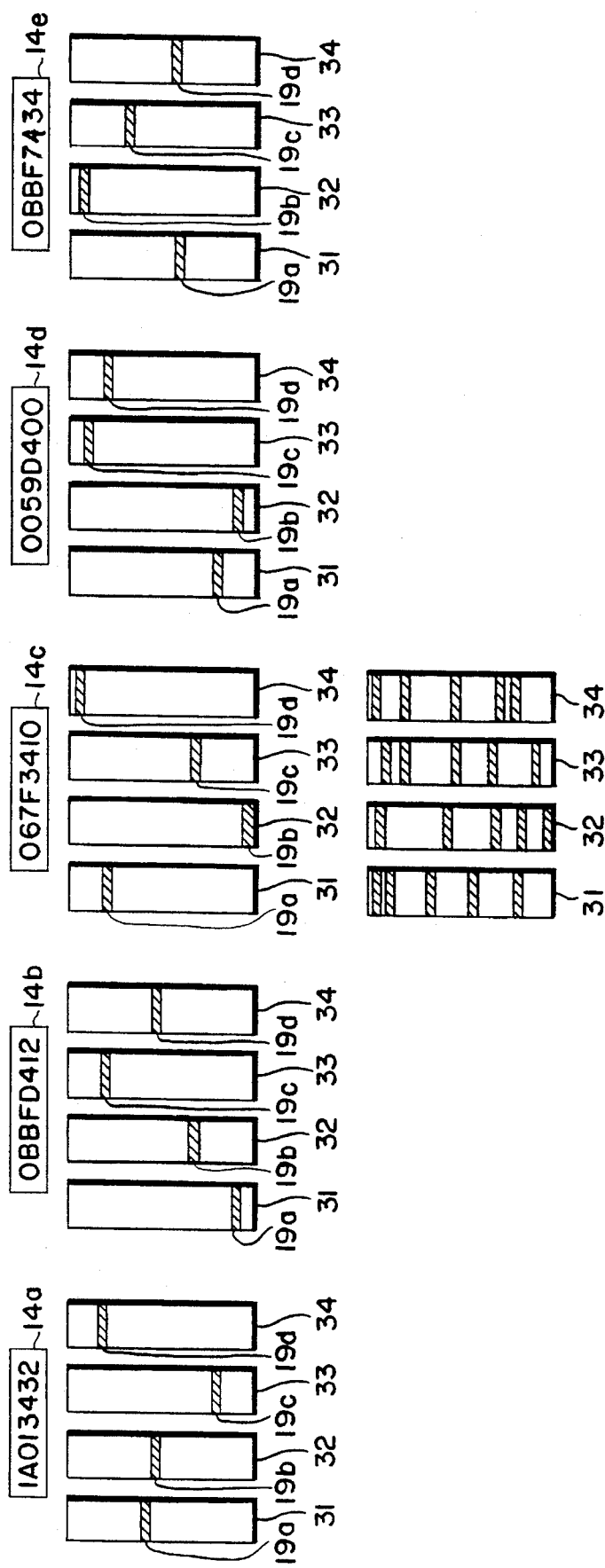
FIG. 7 is a block diagram of the distribution of blocks of data in a multi-way set-associative cache using the hashing technique of FIG. 6.

As shown approximately in FIG. 7, the cache indexes 19a–19d can be used to access each of the data RAMs 31–34. For example, each of the five different addresses 14a–14e, "1A013432," "0BBFD412," "067F3410," "0059D400," and "0BBF7434" maps to a different cache index 19a–19d in each of the data RAMs 31–34. By randomizing the distribution of the cache index 19, according to the present invention, it is possible to have as many as twenty possible blocks 39 for storing data from five hot memory addresses, as compared to only four different places when using prior art techniques, substantially improving the hit ratio of multi-way set-associative caches.

While there has been shown and described a preferred embodiment, it is to be understood that various other adaptations and modifications may be made within the spirit and scope of the invention.

What is claimed is:

1. An apparatus for a central processing unit to address data in a second memory, the data in the second memory being a copy of data in a first memory, the first memory having a plurality of bytes storing data, each byte of the first memory addressable by a memory address, comprising:

means for storing a plurality of tags and a plurality of blocks in the second memory, each tag associated with one block, and each tag and said associated one block addressable by an index;

means, connected to an input of the second memory, for converting a selected memory address to a selected tag and a plurality of different indexes, each different index individually addressing one of said plurality of tags in the second memory;

means, connected to said means for converting and said means for storing said plurality of tags, for comparing said selected tag with each of said plurality of tags individually addressed by each of said plurality of different indexes; and means, connected to said means for comparing and said means for storing said plurality of blocks and responsive to said selected tag being equal to one of said plurality of tags individually addressed by each of said different indexes, for addressing a selected block associated with said selected tag to transfer data from the central processing unit to the second memory.

2. The apparatus as in claim 1 whereto said means for converting includes means for translating said selected memory address to said selected tag and a selected index, and a plurality of means for combining said selected tag and said selected index to generate said plurality of different indexes.

3. The apparatus as in claim 2 wherein each of said means for combining includes a boolean hashing function.

4. The apparatus as in claim 3 wherein said boolean hashing function includes an exclusive OR function.

5. The apparatus as in claim 1 wherein said plurality of tags and said plurality of blocks are organized into a plurality of sets of tags and blocks, one set of tags and blocks for each of said plurality of different indexes.

6. The apparatus as in claim 1 wherein said plurality of tags are concurrently addressable by said plurality of different indexes and further comprising:

a plurality of sets of lines connecting said means for converting, each one of said sets of lines for carrying one of said plurality of different indexes.

7. A method for a central processing unit to address data in a second memory, the data in the second memory being a copy of data in a first memory, the first memory having a plurality of bytes storing data, each byte of the first memory addressable by a memory address, the method comprising:

organizing the second memory into a plurality of tags and a plurality of blocks, each tag associated with one block, and each tag and said associated one block addressable by an index;

converting a selected memory address to a selected tag and a plurality of different indexes, each different index individually addressing a different tag in the second memory;

comparing said selected tag with each of said different tags; and addressing, as determined by said selected tag being equal to one of said different tags, a selected block associated with said selected tag to transfer data between the central processing unit and the second memory.

8. The method in claim 7 wherein said step for converting includes the step of translating said selected memory address to said selected tag and a selected index, and a step for combining said selected tag and said selected index to generate said plurality of different indexes.

9. The method as in claim 8 wherein said step for combining includes the step of hashing by a plurality of boolean hashing functions to generate said plurality of different indexes.

10. The method as in claim 9 wherein said hashing step includes the step of exclusive ORing.

11. The method as in claim 7 including the step of organizing said plurality of rags and said plurality of blocks into a plurality of sets of tags and blocks, one set of tags and blocks for each of said different indexes.

12. The method as in claim 7 including the step of concurrently addressing said plurality of tags by said selected tag and addressing said selected block by said plurality of different indexes.

13. An apparatus for a central processing unit to address data in a second memory, the data in the second memory being a copy of data in a first memory, the first memory having a plurality of bytes storing data, each byte of the first memory addressable by a memory address, comprising:

means for storing a plurality of tags and a plurality of blocks in the second memory, each tag associated with one block, and each tag and said associated one block concurrently addressable by an index, said plurality of tags and said plurality of blocks organized into a plurality of sets of tags and blocks, one set of tags and blocks for each of said different indexes;

means, connected to an input of the second memory, for translating a selected memory address to a selected tag and a selected index, said selected tag, said selected index, and said selected memory address each having a plurality of bits, the number of bits of said selected tag plus the number of bits of said selected index equal to the number of bits of said selected memory address;

a plurality of means, connected to said means for translating, for combining said bits of said selected tag and an equal number of bits of said selected index to generate a plurality of different indexes, each different index individually addressing a different tag in the second memory, the number of different indexes equal to the number of said sets into which said tags and said associated blocks are organized;

means, connected to an output of the second memory, for comparing said selected tag with each of said different tags; and means, connected to said means for comparing and responsive to said selected tag being equal to one of said different tags, for addressing a selected block associated with said selected tag to transfer data between the central processing unit and the second memory.

14. The apparatus as in claim 13 wherein each of said means for combining includes an exclusive OR function.

15. The apparatus as in claim 13 wherein said means for comparing includes a comparator and said means for addressing said selected block includes a multiplexer.

16. The apparatus as in claim 13 wherein the second memory is a cache buffer memory.

17. The apparatus as in claim 13 wherein each of said sets is a random access memory.

* * * * *